United States Patent
Grobman

(10) Patent No.: US 7,739,532 B2
(45) Date of Patent: Jun. 15, 2010

(54) METHOD, APPARATUS AND SYSTEM FOR ENHANCED CPU FREQUENCY GOVERNERS

(75) Inventor: Steven L. Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 888 days.

(21) Appl. No.: 11/518,004

(22) Filed: Sep. 7, 2006

(65) Prior Publication Data

US 2007/0150893 A1 Jun. 28, 2007

Related U.S. Application Data

(63) Continuation-in-part of application No. 10/862,980, filed on Jun. 7, 2004, now Pat. No. 7,334,145.

(51) Int. Cl.
*G06F 9/455* (2006.01)
*G06F 1/00* (2006.01)

(52) U.S. Cl. .......................... 713/322; 718/1

(58) Field of Classification Search .................. 713/322
See application file for complete search history.

(56) References Cited

U.S. PATENT DOCUMENTS

| | | | |
|---|---|---|---|
| 6,952,782 B2 * | 10/2005 | Staiger | 713/300 |
| 7,386,739 B2 * | 6/2008 | Ghiasi et al. | 713/300 |
| 2004/0139302 A1 * | 7/2004 | Flautner et al. | 712/220 |
| 2005/0154860 A1 * | 7/2005 | Arimilli et al. | 712/216 |
| 2005/0273636 A1 | 12/2005 | Grobman | |
| 2005/0289648 A1 | 12/2005 | Grobman et al. | |
| 2006/0146057 A1 * | 7/2006 | Blythe | 345/506 |
| 2007/0028244 A1 * | 2/2007 | Landis et al. | 718/108 |

OTHER PUBLICATIONS

Steven Grobman, "Method, Apparatus and System for Processor Frequency Governers . . . ", U.S. Appl. No. 11/395,050, filed Mar. 31, 2006.

* cited by examiner

*Primary Examiner*—Thomas Lee
*Assistant Examiner*—Brandon Kinsey
(74) *Attorney, Agent, or Firm*—Joni D. Stutman

(57) ABSTRACT

A method, apparatus and system enable enhanced processor frequency governors to comprehend virtualized platforms and utilize predictive information to enhance performance in virtualized platforms. Specifically, in one embodiment, an enhanced frequency governor in a virtual host may run within a virtual machine on the host and interact with a virtual machine manager to collect predictive information from application(s) running within each virtual machine on the host. The enhanced frequency governor may then utilize the predictive information to determine future CPU frequency requirements and raise or lower the CPU frequency and/or voltage in anticipation of the needs of the various applications.

13 Claims, 10 Drawing Sheets

METHOD, APPARATUS AND SYSTEM FOR ENHANCED CPU FREQUENCY GOVERNERS

RELATED APPLICATIONS

The present application is a continuation-in-part of co-pending patent U.S. application Ser. No. 10/862,980 entitled "Predictive Processor Speed Governor", filed on Jun. 7, 2004, now U.S. Pat. No. 7,334,145, and assigned to the assignee of the present application, and co-pending patent U.S. application Ser. No. 11/395,050, entitled "Method, Apparatus and System for CPU Frequency Governors to Comprehend Virtualized Platforms", filed on Mar. 31, 2006, and assigned to the assignee of the present application.

BACKGROUND

Mobile processor-based systems such as laptop computers and handheld computers, and other processor-based devices such as mobile phones and game consoles, can offer improved power performance using a processor ("CPU") speed governor or CPU frequency governor. In a typical situation, CPUs such as Intel Pentium® M, Intel Core®, Core Duo® and Core 2 Duo® with Intel SpeedStep® technology have a frequency governor that may be controlled by an operating system ("OS"). Automatic CPU frequency governors are typically software components within the OS that optimize the platform's power/performance by automatically scaling the CPU frequency and/or voltage based on CPU load. In one mode of operation, an automatic configuration of the frequency governor raises or lowers the clock frequency at which the CPU operates based on a recently sampled level of utilization of the CPU. Typically, the governor analyzes CPU utilization at regular intervals, such as 250 ms, dropping the frequency in response to high-idle periods, and raising it in response to high-utilization periods. CPU utilization is typically calculated by detecting if the CPU is halted when a periodic timer interrupt on the platform is fired. Thus, for example, if the timer interrupt fires 1000 times per second and in the last 1/10 of a second, the CPU was halted 40 of 100 times when the timer interrupt fired, the OS may calculate a CPU "load" of 60%.

FIG. 1 is a graph illustrating CPU utilization when a program is executed on an ungoverned system (shown at 140) and, superimposed on the graph is a typical response of a frequency governor to the execution of the program on a governed system, (shown at 120). As may be seen from the figure, this method provides a coarse relationship between CPU frequency and the capacity required by the programs executing on the system. Because the frequency governor lags the actual behavior of the program and because the changes in frequency therefore only occur at relatively large intervals, the actual frequency may lag the required capacity significantly. As the figure illustrates, a quick increase in utilization may only be met with a corresponding increase in frequency after a substantial interval has already elapsed and the CPU needs of the program have started to fall, 160. Alternatively, the CPU frequency may stay high, unnecessarily draining power, long after the need for high CPU capacity has already fallen off, 180.

In order to improve battery life, it is generally considered advantageous for a frequency governor to lower CPU frequency and voltage to the minimal available frequency level that exceeds the frequency required to prevent CPU saturation. In an ideal scenario, this would be possible if the future CPU utilization of the system were known. In general, however, for an arbitrary program executing on a CPU-based system, predicting the expected utilization of the CPU for the execution of the program is difficult or infeasible, because the past performance of an application is not always a good indicator future demand. This may happen, at least in part, because CPU utilization depends on the inputs to an executing program and for many executing programs, the future values of input data are unpredictable.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for enhanced CPU frequency governors. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

As previously discussed, typical CPU frequency governors analyze CPU utilization and raise or lower CPU frequency and/or voltage based on CPU utilization. According to embodiments of the present invention, however, enhanced CPU frequency governors include CPU governors capable of understanding virtualized platforms as well as ones capable of utilizing performance profiles to "predict" CPU utilization. These enhanced CPU frequency governors may utilize their predictive capabilities within the virtualized environment to further improve comprehension of virtualized platforms, thus leading to improved performance on the platform. Details of these enhanced frequency governors are described below. For simplicity, the following sections outline (i) CPU frequency governors within virtualized environments; (ii) CPU frequency governors with predictive capabilities; and (iii) enhanced CPU frequency governors that incorporate features from (i) and (ii) above.

Figure 1:
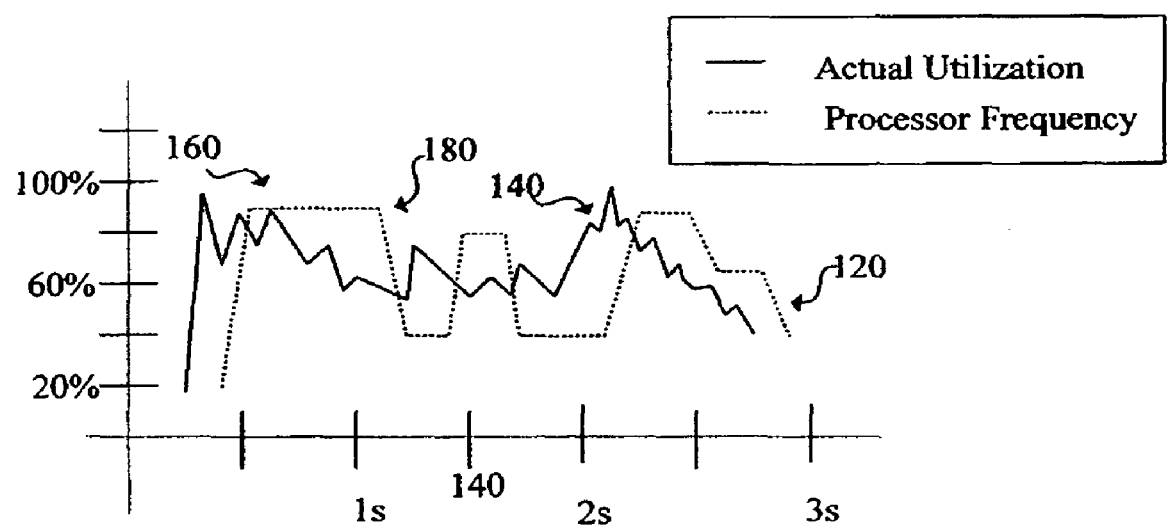
FIG. 1 illustrates the response of a typical CPU frequency governor in an automatic configuration to a shown utilization profile.
Figure 2A:
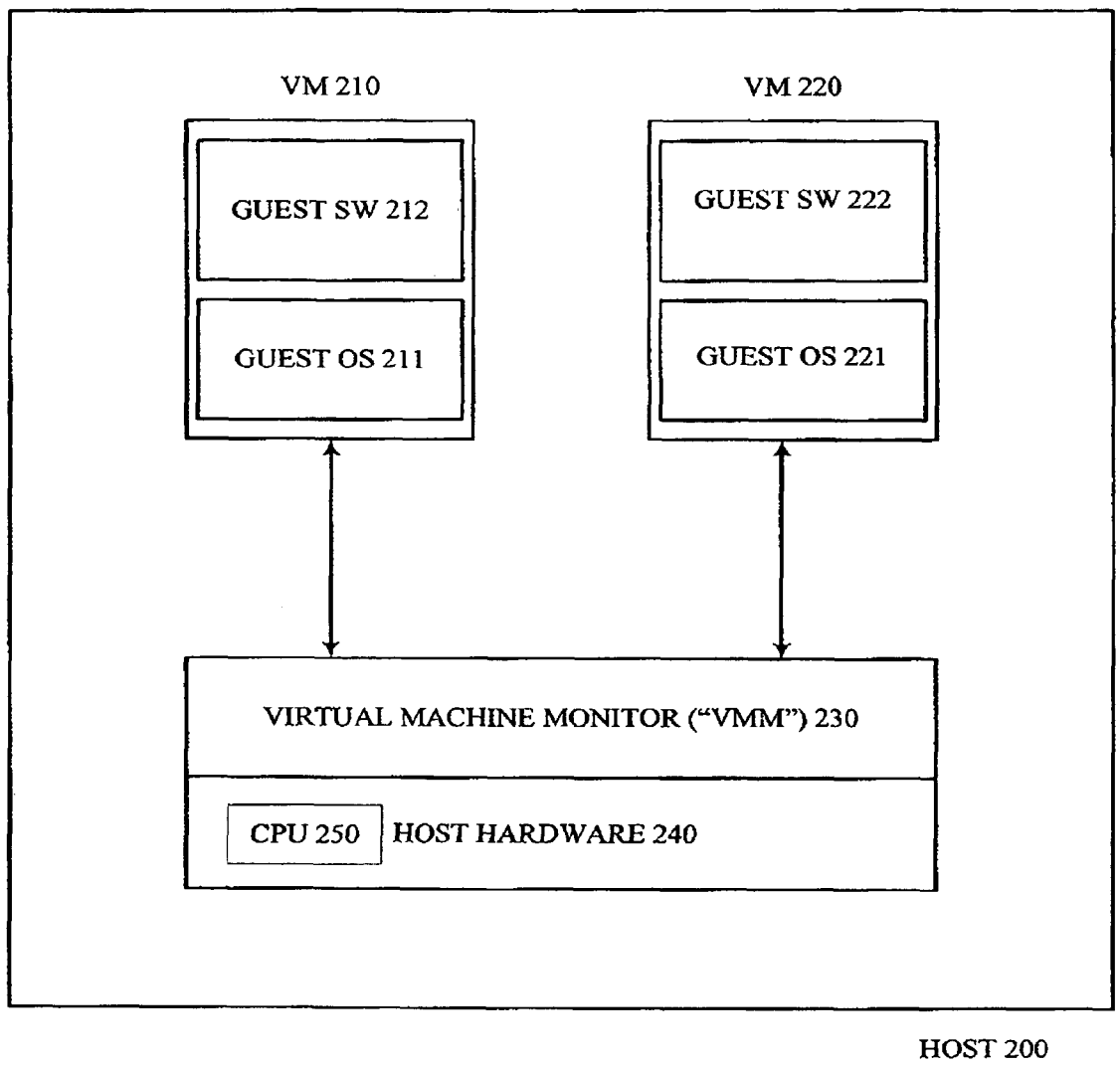
FIG. 2A illustrates an example of a typical virtual machine platform.

In order to facilitate understanding of embodiments of the invention, the following is a general description of a virtualized platform. FIG. 2A illustrates an example of a typical virtual machine host platform ("Host 200") having a virtual-machine monitor ("VMM 230") that presents an abstraction(s) and/or view(s) of the platform (also referred to as "virtual machines" or "VMs") to other software. Although only two VM partitions are illustrated ("VM 210" and "VM 220", hereafter referred to collectively as "VMs"), these VMs are merely illustrative and additional virtual machines may be added to the host. VMM 230 may be implemented in software (e.g., as a standalone program and/or a component of a host operating system), hardware, firmware and/or any combination thereof.

VM 210 and VM 220 may function as self-contained platforms respectively, running their own "guest operating systems" (i.e., operating systems hosted by VMM 230, illustrated as "Guest OS 211" and "Guest OS 221" and hereafter referred to collectively as "Guest OS") and other software (illustrated as "Guest Software 212" and "Guest Software 222" and hereafter referred to collectively as "Guest Software"). Each Guest OS and/or Guest Software may operate as if it were running on a dedicated computer. That is, each Guest OS and/or Guest Software may expect to control various events and have access to hardware resources on Host 100. Within each VM, the Guest OS and/or Guest Software may behave as if they were, in effect, running on Host 200's physical hardware ("Host Hardware 240", including "CPU 250")). VMM 230 may be "hosted" (i.e., a VMM that is started from and under the control of a host operating system) or unhosted (e.g., a "hypervisor"). In either scenario, each Guest OS in the VMs believes that it fully "owns" Host 200's hardware.

In a typical hypervisor VMM scenario currently, power management may not be comprehended at all on the platform. In certain emerging implementations of hypervisor VMMs (e.g., a "thin VMM" implementation), on the other hand, the VMM may map the vast majority of hardware on the platform to a single VM. In this thin VMM scenario, there are advantages to running the power management subsystem (including the frequency governor) in this VM. Since the platform hardware is mapped to this VM, it may have the greatest control over managing those resources. Thin VMM implementations may be used, for example, on virtualized platforms that include a dedicated "service" partition that handles platform management tasks such as intrusion detection, as well as monitoring and managing the power policy for the host, while the user may continue tasks uninterrupted in a "capability" partition. In these environments, the thin VMM may map all or the majority of hardware on the host directly to the capability partition.

There are, however, disadvantages to this thin VMM type scenario because the frequency governor in the capability VM may only "see" the activities within that VM. In other words, since the frequency governor is typically monitored by the OS on the host, in this virtualized scenario, the OS in the capability partition (i.e., the OS observing the CPU state when the timer interrupt fires) may monitor the frequency governor, which in turn is monitoring the CPU utilization. In this scenario, the frequency governor may make decisions regarding CPU utilization based solely on the information from the capability partition, regardless of the activities in the service partition. As a result, the frequency monitor may erroneously lower and/or fail to raise the CPU frequency on the host.

Figure 2B:
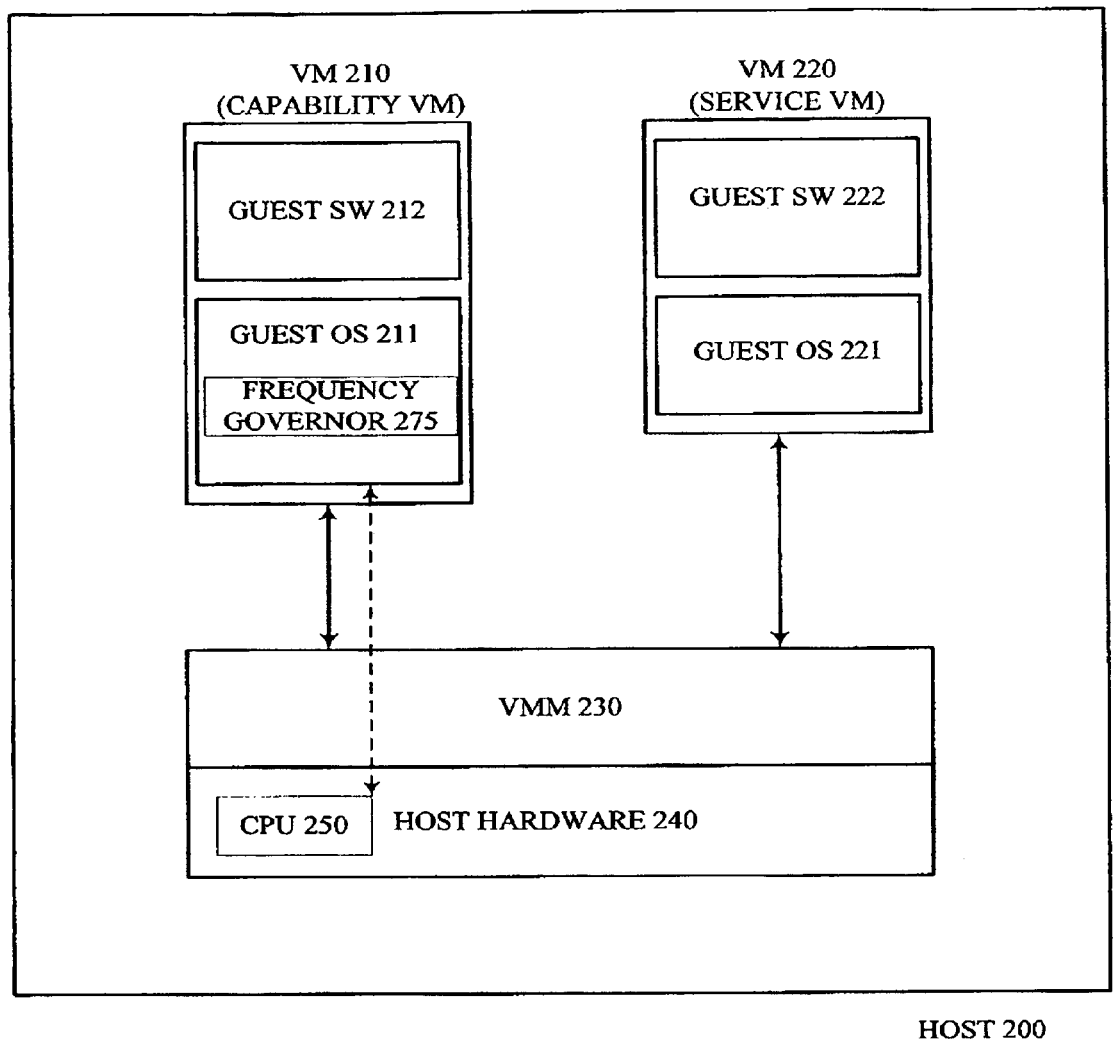
FIG. 2B illustrates an example of a typical virtual machine platform having a thin VMM and dedicated partitions.

By way of example, as illustrated in FIG. 2B, if VM 210 is a capability partition while VM 220 acts as a service partition, Frequency Governor 275 in Guest OS 211 may be responsible for calculating CPU 250 utilization for Host 200, despite the fact that VM 210 is not the only partition on Host 200 that utilizes CPU resources. Given the isolation of the partitions, each partition is typically unaware of other partitions on the virtualized platform. Thus, in this scenario, regardless of whether VM 220 is utilizing significant CPU resources (e.g., performing continuous intrusion detection), if VM 210 is relatively idle, Frequency Governor 275 in VM 210 may determine that Host 200's CPU utilization is low, and as a result, lower Host 200's CPU frequency. In reality, given the activity in VM 220, the desired behavior may be to maintain or raise the frequency.

According to an embodiment of the present invention, the frequency governor on Host 200 may be enhanced to comprehend the virtualized platform, i.e., to comprehend physical CPU utilization spanning all partitions on the platform, thus enabling the frequency governor to optimize CPU utilization more accurately than it is currently able to. Thus, according to an embodiment of the invention, the enhanced frequency governor may be "para-virtualized". The term "para-virtualized" is well known to those of ordinary skill in the art and includes platform components that are aware that they are running in a virtualized environment and that are capable of utilizing features of the virtualized environment to optimize performance and/or simplify implementation of a virtualized environment. Thus, in one embodiment, the enhanced frequency governor may be aware that it is running in a virtualized environment and utilize this awareness to enhance its performance.

Figure 3:
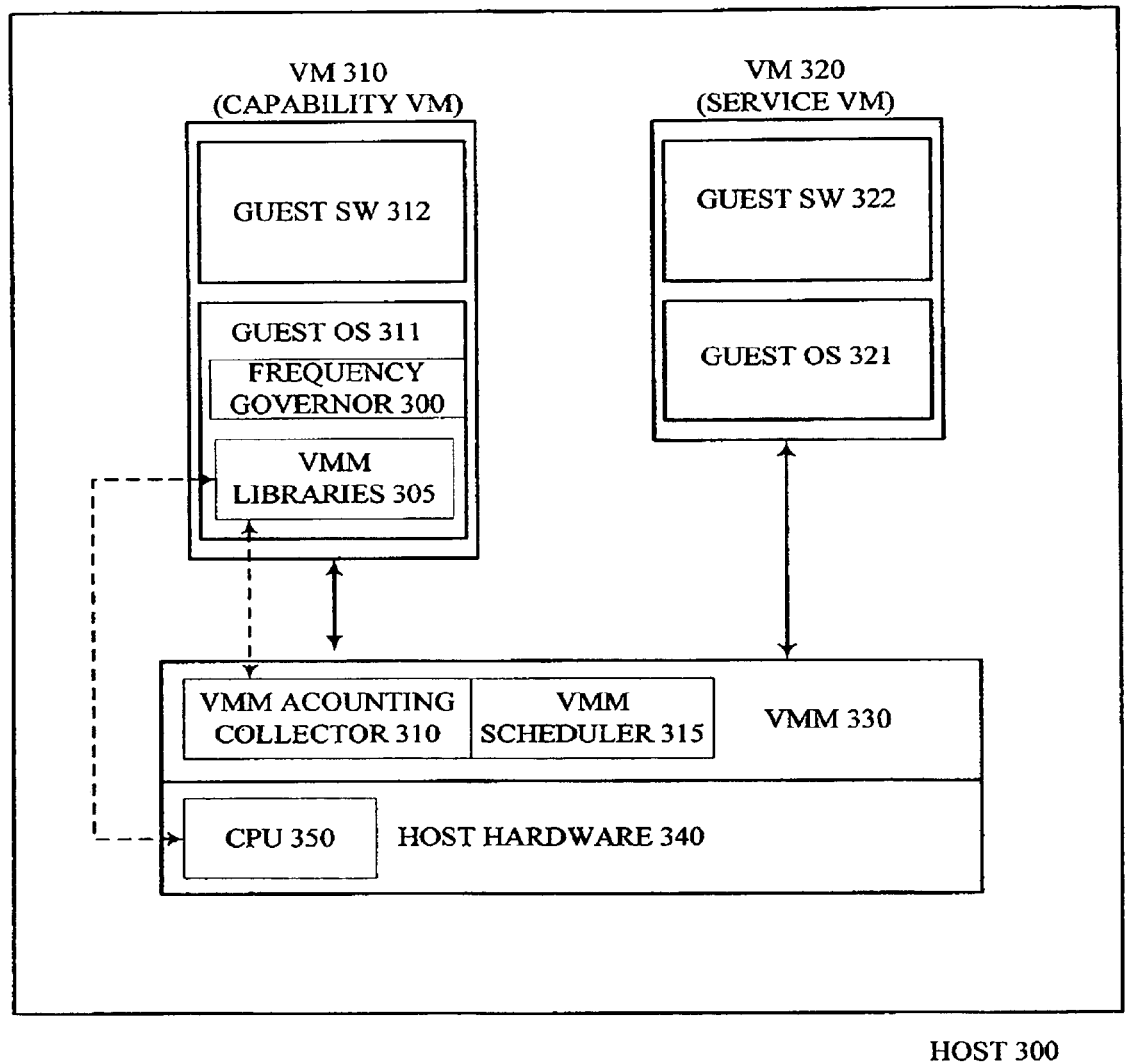
FIG. 3 illustrates an embodiment of the present invention.

Thus, according to one embodiment as illustrated in FIG. 3, the enhanced frequency governor ("Frequency Governor 300") may include a set of libraries ("VMM Libraries 305") that enable the governor to interact with VMM 330 via an "accounting collector" ("VMM Accounting Collector 310") in VMM 330. In contrast with a non-para-virtualized frequency governor that would typically monitor only OS 311, according to embodiments of the present invention, since Frequency Governor 300 is aware that it is running on an operating system-managed by VMM 330, Frequency Governor 300 may, via VMM Libraries 305 and VMM Accounting Collector 310, interact with VMM 330 to determine actual CPU utilization on Host 300. More specifically, VMM Accounting Collector 310 may interact with the scheduler ("VMM Scheduler 315") within VMM 330 to collect information pertaining to CPU utilization across the various VMs on Host 300 and this information may be provided to Frequency Governor 300 (via VMM Libraries 305) with the requisite information for Frequency Governor 300 to determine accurate CPU utilization.

Thus, for example, in one embodiment, Frequency Governor 300 may receive information from VMM 330 based on the actual activity within the various VMs on Host 300. The CPU utilization calculated based on this information may provide Frequency Governor 300 with a more accurate picture of Host 300's CPU utilization than otherwise. This embodiment does, however, incur a performance cost since VMM 330 has to continuously collect timer interrupt information from the various VMs and the Frequency Governor 300 has to continuously interact with VMM 330 in order to obtain information about CPU usage by various VMs.

In an alternate embodiment, in order to improve performance, VMM 330 may avoid continuously intercepting timer interrupts from various VMs. Instead, at specific intervals, Frequency Governor 300 may monitor the state of VMM 330.

If none of the VMs on Host 300 are active, VMM 330 may be in a sleep state and conversely, if at least one VM is active, VMM 330 may show as being active. Thus, in this scenario, if Host 300's timer interrupt fires 1000 times per second, Frequency Governor 300 may obtain information in each of these time interrupts as to the state of VMM 330. Frequency Governor 300 may calculate CPU utilization based on this information, under the assumption that the state of VMM 330 is an accurate indicator of the state of the CPU (active vs. not active). Although possibly less accurate than other embodiments, this embodiment nonetheless enjoys the benefit of good accuracy coupled with better performance because VMM 330 may not have to monitor the activities in each VM on Host 300 in order for Frequency Governor 300 to calculate CPU utilization. In yet other alternate embodiments, Frequency Governor 200 may comprise alternative types of frequency governors that include predictive capabilities to improve frequency governance in specific instances. These alternative frequency governors are described in further detail below.

Figure 4:
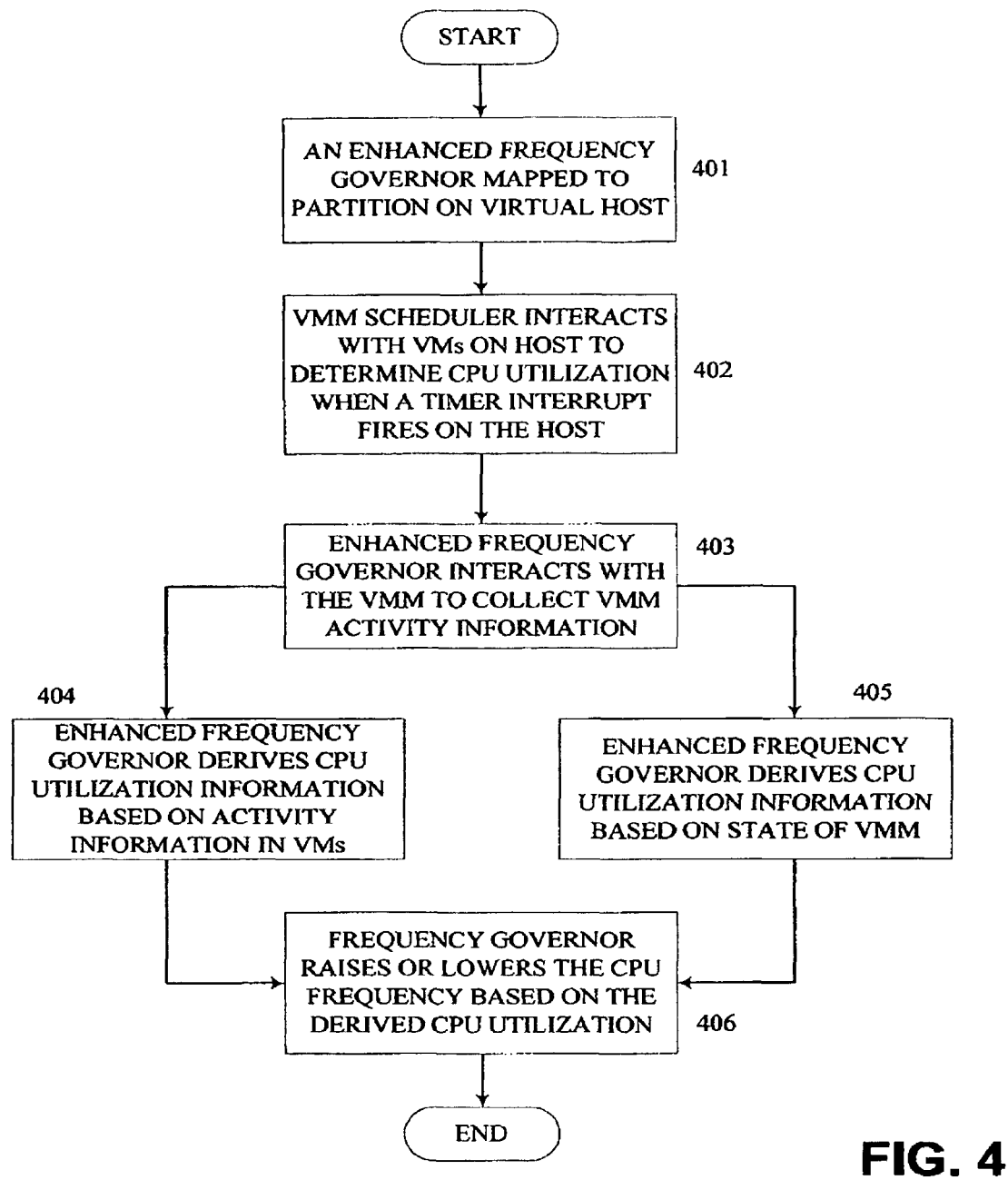
FIG. 4 is a flow chart illustrating an embodiment of the present invention.

FIG. 4 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 401, an enhanced frequency governor may be mapped to a partition on a virtual host while in 402, a VMM scheduler may interact with the VMM on the virtual host to collect activity information from all the partitions on the host when a timer interrupt fires on the host. In 403, the enhanced frequency governor may interact with a VMM accounting collector in the VMM via VMM libraries. In one embodiment, the VMM accounting collector may obtain information from the VMM scheduler, to derive CPU utilization information. In one embodiment, in 404, the CPU utilization information may be derived from the activity information collected from all the partitions on the host. In an alternate embodiment, in 405, the CPU utilization information may be derived from the state of the VMM itself. In 406, the frequency governor may utilize the CPU frequency information to perform platform governance (i.e., raise or lower the CPU frequency as appropriate, based on the data).

Thus far, embodiments of the present invention have been described with respect to a hypervisor (or thin VMM) scenario. Alternatively, embodiments of the present invention may be implemented on a host base VMM, i.e., a VMM that may reside on an operating system. In these host based virtualized environments, the operating system may retain control of the platform while the VMM runs on the operating system and works in conjunction with the operating system to manage the VMs on the platform management functionality.

Within host based virtual machines, the frequency governance problems described above with respect to embodiments of the present invention may not arise. As a direct result of having an OS that is aware of all the activities within various VMs on the host, the OS may in fact include a frequency governor that is aware of the virtualized platform, i.e., aware of the activity within each of the VMs on the platform. According to embodiments of the present invention, however, frequency governor 200 may be enhanced further to utilize performance profiles to "predict" CPU utilization. Details of these enhanced frequency governors are described in additional detail below.

CPU utilization behavior of a program may not vary significantly from one run to another for a certain classes of applications. One specific class of applications that meets this criteria includes programs that run on exactly the same data over and over again. In one instance, a software Compact Disc ("CD") player that plays back an audio CD on a computer would be likely to present a very similar processor utilization profile each time the same CD was played by the application. In another, a decoder for data encoded in one of the widely used Motion Pictures Experts Group (MPEG) formats such as MPEG Layer 2 ("MPEG-2") would be likely to exhibit the same processor utilization behavior each time it was used to decode the same set of MPEG 2 data. Specifically a software application to decode and play back a video Digital Versatile Disc ("DVD-Video") would be likely to exhibit the same processor utilization profile each time the same DVD-Video was played on a specific system, given that no other application on the system was contributing significantly to processor load.

Figure 7:
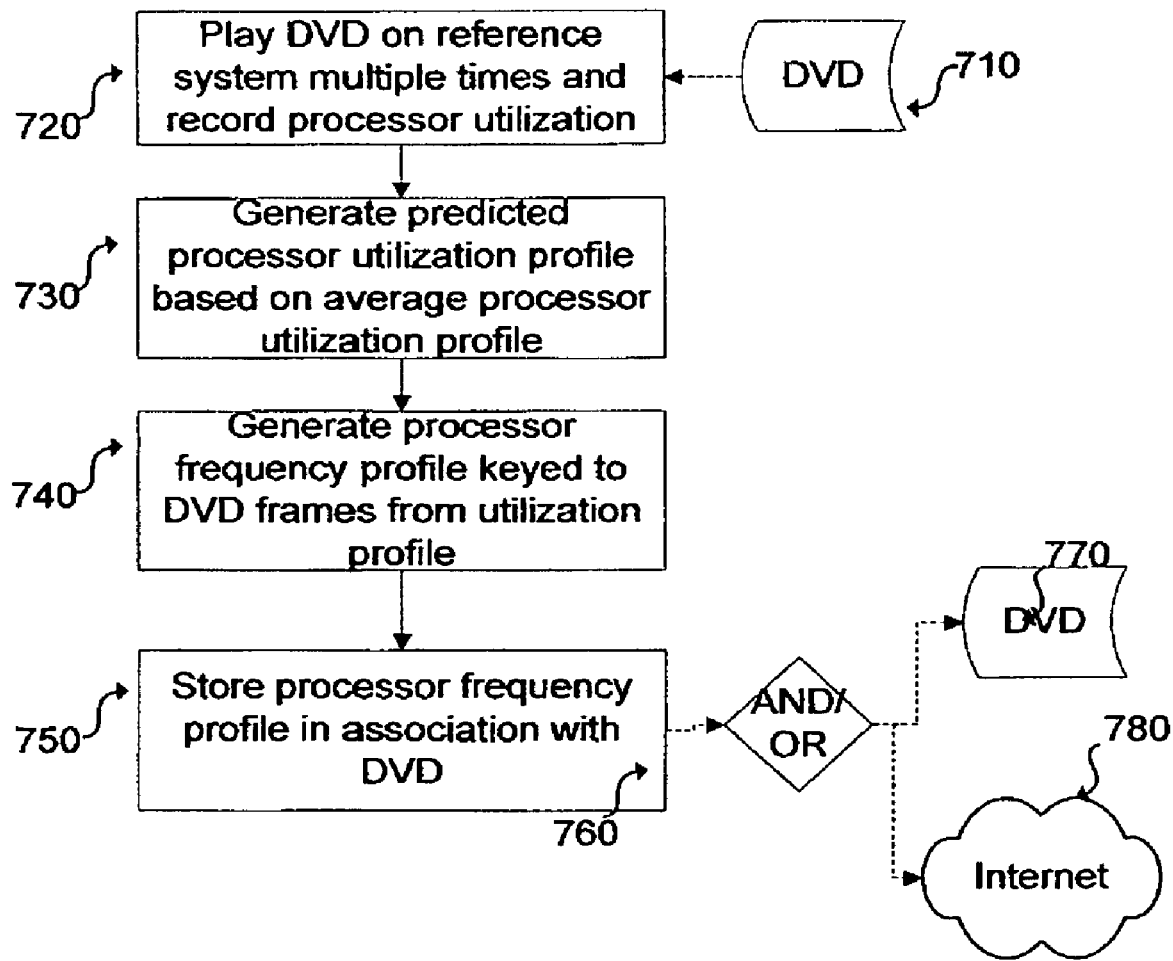
FIG. 7 is a high level flowchart of a process to generate a CPU frequency profile in one embodiment.

In one embodiment, an alternative frequency processor may be utilized within the a reference processor-based system may be used as in FIG. 7 to generate a predictive performance profile for an application, executing on the system that is decoding and playing a DVD-Video. Such a system could in one embodiment be a laptop using Intel Centrino® Mobile Technology, based on an Pentium® M processor with Intel SpeedStep® technology. As in FIG. 7, a specific DVD-video 710 is played, 720, on the reference system to obtain a record of processor utilization during the execution of the software related to playback of the DVD-video, including a decoder to perform MPEG 2 decoding. The reference system would in this embodiment, in general, be configured to be running no other significant load and therefore the obtained record would be a reasonably accurate representation of the processor utilization required solely for DVD-video playback for the specific disc used. This processor utilization may be repeatedly obtained over several runs for a higher level of accuracy and an average computed, 730, using any of a well known set of standard methods such as arithmetic mean computation at selected points of time of the utilization data, obtained during the various runs. It is possible to do this averaging procedure meaningfully because it is known that repeated runs of an MPEG 2 decoder on the same MPEG data produce similar or nearly identical demands on the processor as related to the time elapsed with reference to the start of the encoded audio and video data. This is because the decoder's execution must execute at a standard frame rate and decode the same data at each frame in the same way from one instance of DVD-video playback to another, as long as the disc, the system, and other loads on the system are unchanged.

In other embodiments, the reference system may be a different type of processor-based system, including a desktop system, or a game console capable of playing DVD-video. In some embodiments, the application for which processor utilization data is obtained may be an audio playback application such as an MPEG Layer 3 (MP-3) player executing on a system such as a personal digital assistant, a portable processor-based digital media player, or a wireless communicator such as a cellular phone. In some embodiments the same general technique may be used to obtain a utilization profile for another type of application that is used multiple times on the same, predetermined, data set. In yet other embodiments it may be possible to predict the processor utilization profile directly by analysis of the predetermined data set without a need to actually run the system in order to obtain the profile, especially if the processor performance and the behavior of other processes such as operating system functions executing on the system alongside the application is well characterized and understood.

Figure 5:
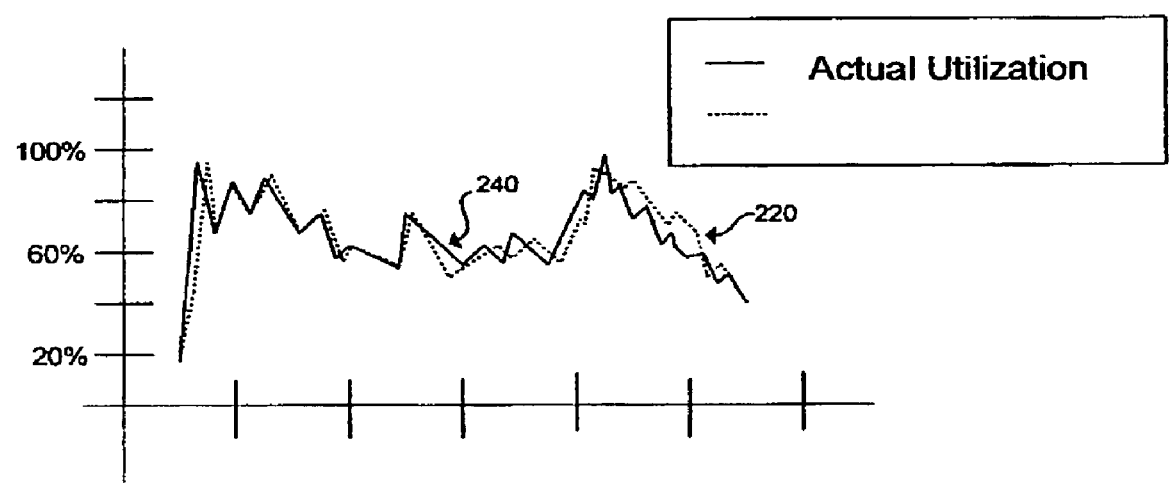
FIG. 5 illustrates a comparison between the actual utilization of a CPU and that predicted by an averaging process based on reference runs as used in one embodiment.

The average CPU utilization profile obtained as described above may now be considered a prediction of a processor demand profile for a system similar to the reference system, playing the identical DVD-video (or, in general, using the same data set) as the one used to generate the profile. FIG. 5 is a simplified figure, drawn to illustrate a typical comparison between the average CPU utilization profile and the actual utilization of the CPU while playing back the same disc as the one used to generate the average profile on the same system. As may be seen from the figure, the actual utilization 540 is very close to the predicted utilization 520.

Figure 6:
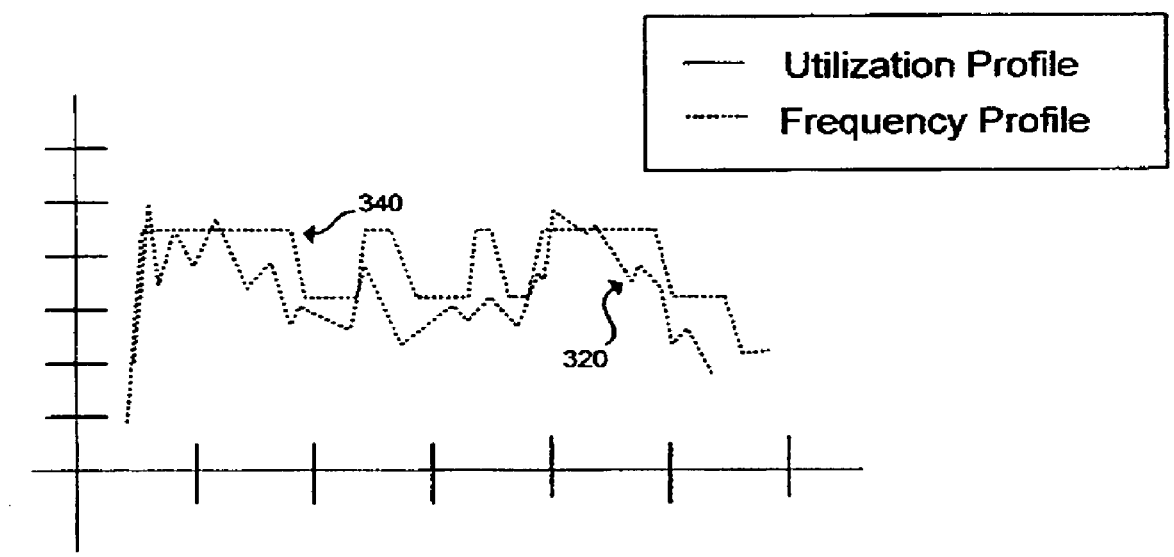
FIG. 6 depicts the response of a CPU frequency governor using a performance profile to guide frequency changes as used in one embodiment.

A CPU frequency profile is a simplified version of the processor utilization profile and is illustrated in FIG. 6 at 640. The frequency profile is simplified to more closely correspond to the information necessary for a processor speed governor to operate according to the predicted utilization profile 620. CPU frequency governors such as the one in the embodiment including the laptop system described above operate in a stepped manner. That is, the processor's speed is not generally varied over a continuous range of frequencies, but rather set to one of a discrete set of specific values. Thus, in general, it is not possible for such a processor's frequency to follow a utilization profile exactly because of the stepped manner of the speed governor's operation. The profile 640 is then the closest approximation to the actual utilization profile 620 obtained from the reference processor-based system, by limiting the values of the utilization curve at each point in time to the closest of the discrete values in the set of frequencies available for the speed governor. The final profile obtained by this process may be termed a performance profile.

In some embodiments, the computation of the discrete values corresponding to the predicted utilization profile may be done within the speed governor itself and the actual average utilization profile may be directly used as the performance profile. In other embodiments, the processor speed governor may not be limited to discrete values but may be able to vary the CPU frequency over a continuous range and therefore be able to use the actual average utilization profile as the predicted performance profile for the processor.

As depicted in FIG. 7, a CPU frequency profile is generated from a predicted CPU utilization profile in step 740. In embodiments related to playback of DVD-Video, the performance profile may be stored, 750, on either the disc 770 with the video and audio data itself, and/or, 760, in other embodiments at a server at a network location such as a specific Internet site 780 accessible from a device communicatively coupled to the Internet. In some embodiments the performance profile may be available at both locations. Other locations for storage of the performance profile may include, in some embodiments, a storage device such as a hard disk drive internal to the processor-based system, or a non-volatile memory subsystem such as flash memory. In each case, some method of at least approximately synchronizing the profile to the execution of the program may be used. In the DVD-video embodiment, the profile may be time-keyed to the audio and video MPEG data on the disk, or keyed to the frames of video, as is known in the art.

In some embodiments, no performance profile that exactly matches a particular system's hardware and software configuration, or the particular set of data on which the system is executing, may exist. In such embodiments, however, the system may search a database including a number of previously generated performance profiles for a close match to either the system hardware, system software, or the data set to select an approximately-matched profile from the stored performance profiles in the database. Furthermore, in some embodiments, a system may post a performance profile obtained by executing an application on a data set to a database.

Figure 8:
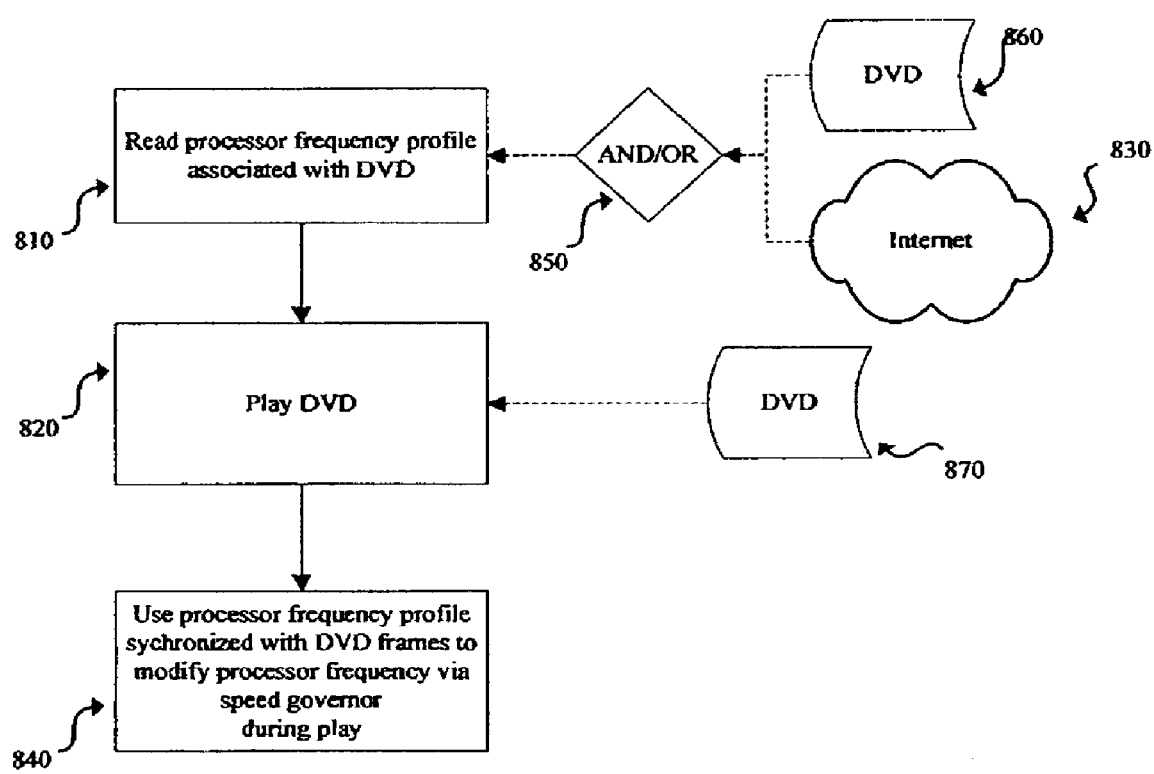
FIG. 8 is a high level flowchart of a process to use a CPU frequency profile to govern CPU frequency in one embodiment.

When an application such as a DVD-Video player executes, it may then use the predicted performance profile obtained to improve the effectiveness of a processor speed governor, and thus in turn the power performance of the system. In FIG. 8, the high level operation of a DVD-Video player embodiment is illustrated. The processor-based system such as a laptop or game console first reads 810 the stored processor performance profile either from the DVD 860 or from a network such as the Internet. In some instances, it may be possible for the system to alternatively retrieve a performance profile stored on the Internet for some DVD-Videos and/or one stored with the DVD-video for others, 850.

During playback the application executes to decode the MPEG data and display it in the standard way, accessing the MPEG and other data 870 to play the DVD-Video 820. The playback is accompanied by variations in CPU frequency as dictated by the predicted performance profile synchronized with the DVD-video being played, and thus the system changes the CPU frequency, 840, as the DVD-video plays, approximately synchronously with the expected processor utilization as discussed above.

Currently available, automatically controlled, CPU frequency governors such as that exemplified by the Intel Pentium® M processor, Intel Core®, Core Duo® and/or Core 2 Duo® with Intel SpeedStep® Technology that are based on responding to current processor utilization as are known in the art, generally operate under complete control of the operating system. In the case of a frequency governor that is controlled in accordance with a performance profile as described in the embodiments discussed here, however, the CPU frequency is generally controlled by the program that is executing, such as a DVD player or other application, in a manner that follows the predicted processor performance profile for the application. The program may do so in some embodiments by accessing a processor speed control interface such as an Application Programming Interface (API) to the speed governor exposed by the operating system to modify processor speed in accordance with a performance profile.

While some of the discussion above has centered on a frequency-based predicted performance profile, in some embodiments the performance profile used by the application-sensitive speed governor system may be an average utilization profile, expressed for example in terms of the percentage of processor capacity utilized at any given time during the period of execution of the application. Such a utilization profile may be translated by the CPU frequency controlling application into a corresponding frequency profile, either to a range of discrete values or to a continuous scale, depending on the characteristics of the speed governor in the underlying hardware, and on the API to the speed governor, in different embodiments.

In some embodiments the methods and systems described may be adapted to parameters other than basic clock frequency that affect processor performance and power consumption. These may include clock frequencies of specific parts of the processor, or those of other subsystems outside the processor, or of peripheral devices. Similar techniques may also be used to reduce actual power provided to either parts of a processor or to other devices in a system. Additionally, although the above description uses examples of existing applications that may take advantage of predictive information, embodiments of the invention are not so limited. Instead, emerging and/or future technologies such as high definition applications may also benefit according to embodiments of the invention.

Similarly, although the above examples utilize a virtualized host, it will be readily apparent to those of ordinary skill in the art that embodiments of the invention may also be implemented within other similar systems having partitions e.g., multi-core systems. For example, on multi-core CPU architectures such as Intel's Core 2 Duo®, each CPU core may be independently managed for frequency and voltage scaling. As a result, according to embodiments of the present invention, an application may provide predictive information to the CPU cores and this information may be used by one of the CPU cores as guidance to future activities for the application. This CPU core may be dedicated to the application while all other activity on the system may be mapped to the one or more other core(s) which may be managed by a typical non-enhanced frequency governor. Additionally, if the platform is virtualized, according to embodiments of the invention, the predictive information may be provided to the VMM which may in turn pass on the information about the CPU core to a VM (regardless of any other activity that may be running on the other core/CPU).

Embodiments of the present invention may incorporate the features of the enhanced frequency governor described with respect to FIGS. 2-4 above with the features described with respect to FIGS. 5-8 above. In other words, according to an embodiment of the present invention, the features of the enhanced frequency governor in the virtualized environment may be incorporated with predictive features to further improve the performance of the enhanced frequency governors. Specifically, as previously discussed, an enhanced frequency governor may comprehend virtualized platforms in one embodiment. Nonetheless, the enhanced frequency governor may be restricted by existing techniques that typically rely on past CPU performance to determine future CPU requirements. According to an embodiment of the present invention, however, the predictive capabilities discussed above may be utilized to determine future CPU requirements. Thus, for example, in one embodiment, a predictive performance profile may be generated for an application and utilized by the enhanced frequency governor to predict future CPU utilization.

In the context of a virtualized environment, the enhanced frequency governor having predictive capabilities may be mapped to a partition on a virtual host, as previously discussed. According to this embodiment, however, instead of a VMM accounting collector collecting activity information from a VMM scheduler pertaining to the various partitions on the host, the VMM accounting collector may collect predictive information from the VMM scheduler. Thus, for example, if a software application to decode and play back a video Digital Versatile Disc ("DVD-Video") resides in VM 210 while a software Compact Disc ("CD") player that plays back an audio CD resides in VM 220, the VMM scheduler may collect predictive information provided by the applications in each VM and provide it to the VMM accounting collector. The VMM accounting collector may, in turn, provide this information to the enhanced frequency governor to improve the effectiveness of the frequency governor on the host, and thus in turn the power performance of the system.

As previously described, performance profiles may be stored on either the DVD-video or audio disc with the video and audio data itself, and/or, in other embodiments at a server at a network location such as a specific Internet site accessible from a device communicatively coupled to the Internet. In some embodiments the performance profile may be available at both locations. Other locations for storage of the performance profile may include, in some embodiments, a storage device such as a hard disk drive internal to the processor-based system, or a non-volatile memory subsystem such as flash memory. In each case, some method of at least approximately synchronizing the profile to the execution of the program may be used. In the DVD-video embodiment, the profile may be time-keyed to the audio and video MPEG data on the disk, or keyed to the frames of video, as is known in the art.

Embodiments of the invention thus enable VMs to provide the frequency governor on the host with information to improve the performance of the host. In other words, in addition to information obtained by the VMM accounting collector, the VMs on the host may, via a variety of schemes (e.g., interpartition communications ("IPC") having a shared memory channel or higher level protocols utilizing an IPC shared memory channel), transmit predictive information to the enhanced frequency governor. The enhanced frequency governor is thus able to utilize the predictive information to more accurately determine each of the VMs' upcoming CPU needs, thus enabling the frequency governor to react before the need arises.

Figure 9:
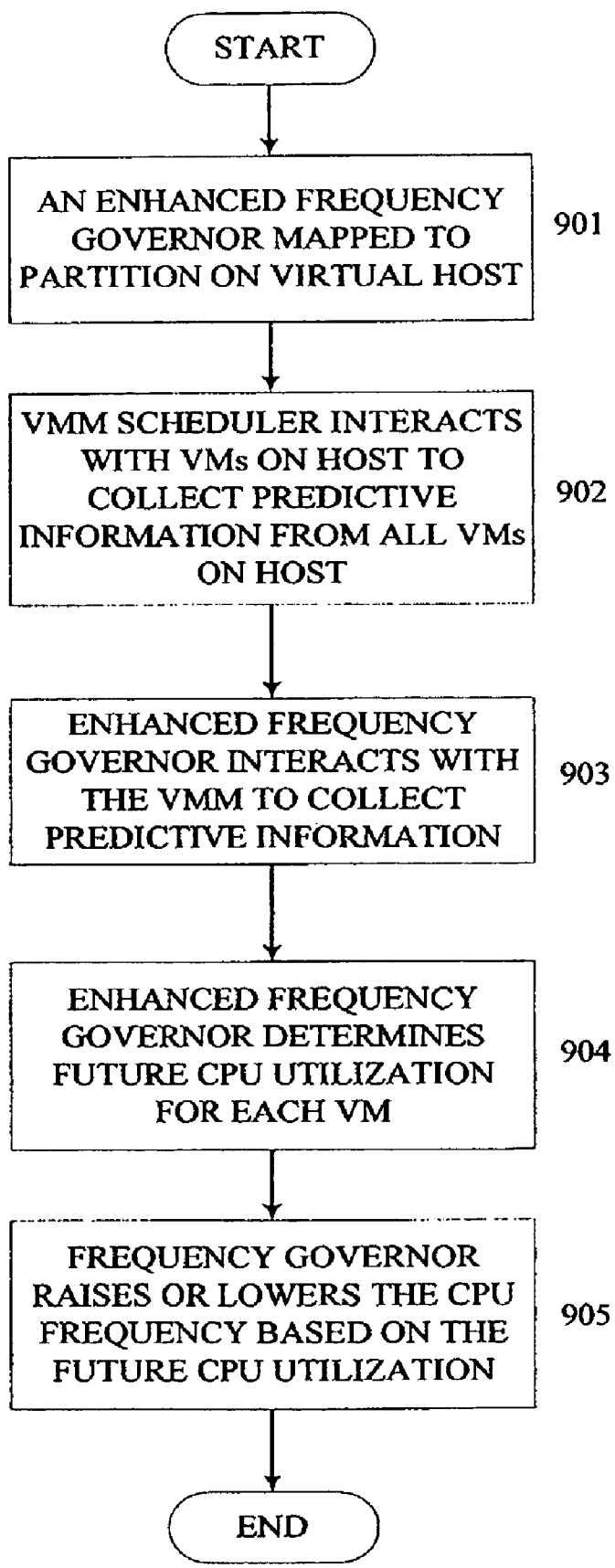
FIG. 9 is a flowchart illustrating an embodiment of the present invention utilizing a predictive profile to anticipate CPU utilization on a platform.

FIG. 9 is a flow chart illustrating an embodiment of the invention. Although the following operations may be described as a sequential process, many of the operations may in fact be performed in parallel and/or concurrently. In addition, the order of the operations may be re-arranged without departing from the spirit of embodiments of the invention. In 901, an enhanced frequency governor may be mapped to a partition on a virtual host while in 902, a VMM scheduler may interact with the VMM on the virtual host to collect predictive information from all the VMs on the host. In 903, the enhanced frequency governor may interact with a VMM accounting collector in the VMM via VMM libraries. In one embodiment, the VMM accounting collector may obtain information from the VMM scheduler, to obtain predictive information from the VMM scheduler and to provide the information to the enhanced frequency governor. In 904, the enhanced frequency governor may utilize the predictive information for each VM (or more specifically, the applications within each VM) to determine future CPU utilization for each VM. In 905, the enhanced frequency governor may raise or lower the CPU frequency as appropriate, based on the future CPU utilization determined from the predictive information.

Embodiments of the present invention may be implemented on a variety of computing devices. According to an embodiment, a computing device may include various other well-known components such as one or more CPUs (e.g., including multi-core systems). The CPU(s) and machine-accessible media may be communicatively coupled using a bridge/memory controller, and the CPU may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the CPU on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

Embodiments may additionally be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps may be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    obtaining predictive information from a plurality of virtual machines (VMs) on a virtual host, wherein obtaining the predictive information further comprises:
        obtaining the predictive information from the plurality of VMs by a scheduler in a virtual machine manager ("VMM"), the obtained predictive information comprising information pertaining to CPU utilization for each of the plurality of VMs,
        determining an application type running in each of the plurality of VMs,
        retrieving a previously generated CPU utilization profile for the application type, wherein the utilization profile for the application type is generated by at least one of (i) capturing actual CPU utilization resulting from running the application type on a reference system and using a predetermined data set, and (ii) predicting behavior or the application type running with the predetermined data set, when system performance for the application type is well characterized and understood, and
        applying the CPU utilization profile for the application type to the CPU utilization for each of the plurality of VMs utilization;
    determining future utilization requirement for a central processing unit ("CPU") of the virtual host based on the predictive information and CPU utilization profile for the application type; and
    scaling a frequency of the CPU (CPU frequency) based on the future utilization requirement.

2. The method according to claim 1 wherein scaling the CPU frequency further comprising raising the CPU frequency if the future utilization of the CPU is predicted to be high and lowering the CPU frequency if the future utilization of the CPU is predicted to be low.

3. The method according to claim 1 further comprising scaling a voltage of the CPU based on the future utilization requirement.

4. A system, comprising:
    a central processing unit ("CPU");
    a virtual machine manager ("VMM") coupled to the CPU;
    a plurality of virtual machines ("VM"s) coupled to the VMM, the VMM capable of collecting predictive information from the plurality of VMs, wherein predictive information comprises at least one of information pertaining to analyzed CPU utilization for each of the plurality of VMs and a utilization profile for an application type running in at least one of the plurality of VMs; and
    an enhanced frequency governor residing in one of the plurality of virtual machines, the enhanced frequency governor capable of interacting with the VMM to predict future CPU utilization based on the predictive information for the plurality of VMs, the enhanced frequency governor further capable of scaling the CPU frequency based on the predicted future CPU utilization.

5. The system according to claim 4 wherein the enhanced frequency governor is further capable of managing CPU frequency by lowering the CPU frequency if the predicted future CPU utilization is low and raising the CPU frequency if the predicted future CPU utilization is high.

6. The system according to claim 4 wherein the VMM includes a VMM scheduler to collect information from the VMs and a VMM accounting module capable of reporting the collected information, the one of the plurality of VMs that includes the frequency governor further comprising a VMM library to interact with the VMM accounting modules to communicate the predictive information for each of the plurality of VMs to the enhanced frequency governor.

7. The system according to claim 4 wherein the enhanced frequency governor is para-virtualized.

8. The system according to claim 4 wherein the enhanced frequency governor is further capable of scaling the CPU voltage based on the future utilization requirement.

9. The system according to claim 4 further comprising at least one of a second CPU and a second core coupled to the VMM, the VMM capable of dedicating the one of the second CPU and the second core to one of the plurality of VMs and communicating the predictive information to the one of the second CPU and second core.

10. A machine-readable medium having stored thereon instructions that, when executed by a machine, cause the machine to:
    obtain predictive information from a plurality of virtual machines (VMs) on a virtual host, wherein obtaining the predictive information further comprises:
        obtaining the predictive information from the plurality of VMs by a scheduler in a virtual machine manager ("VMM"), the obtained predictive information comprising information pertaining to CPU utilization for each of the plurality of VMs, determining an application type running in each of the plurality of VMs, retrieving a previously generated CPU utilization profile for the application type, wherein the utilization profile for the application type is generated by at least one of (i) capturing actual CPU utilization resulting from running the application type on a reference system and using a predetermined data set, and (ii) predicting behavior or the application type running with the predetermined data set, when system performance for the application type is well characterized and understood, and applying the CPU utilization profile for the application type to the CPU utilization for each of the plurality of VMs utilization; determine future utilization requirement for a central processing unit ("CPU") of the virtual host based on the predictive information;

and scale a frequency of the CPU (CPU frequency) based on the future utilization requirement.

11. The medium according to claim 10 wherein the instructions, when executed by the machine, cause the machine to scale the CPU utilization by raising the CPU frequency if the future utilization of the CPU is predicted to be high and lowering the CPU frequency if the future utilization of the CPU is predicted to be low.

12. The medium according to claim 10 wherein the instructions, when executed by the machine, cause the machine to scale the CPU voltage based on the future utilization requirement.

13. The system as recited in claim 4, wherein the utilization profile for the application type is generated by at least one of (i) capturing actual CPU utilization resulting from running the application type on a reference system and using a predetermined data set, and (ii) predicting behavior or the application type running with the predetermined data set, when system performance for the application type is well characterized and understood.

* * * * *